(12) United States Patent
Patterson et al.

(10) Patent No.: US 10,214,266 B2
(45) Date of Patent: *Feb. 26, 2019

(54) METHOD AND APPARATUS FOR DISPOSAL OF CUTTINGS

(71) Applicant: Central Boat Rentals, Inc., Morgan City, LA (US)

(72) Inventors: Michael Patterson, Morgan City, LA (US); Edward L. Shearer, Metairie, LA (US)

(73) Assignee: Central Boat Rentals, Inc., Morgan City, LA (US)

( * ) Notice: Subject to any disclaimer, the term of this patent is extended or adjusted under 35 U.S.C. 154(b) by 16 days.

This patent is subject to a terminal disclaimer.

(21) Appl. No.: 15/340,070

(22) Filed: Nov. 1, 2016

(65) Prior Publication Data

US 2017/0113764 A1 Apr. 27, 2017

Related U.S. Application Data

(63) Continuation of application No. 14/022,348, filed on Sep. 10, 2013, now Pat. No. 9,482,065, which is a
(Continued)

(51) Int. Cl.
*E21B 21/06* (2006.01)
*B63B 35/28* (2006.01)
(Continued)

(52) U.S. Cl.
CPC ............ *B63B 35/28* (2013.01); *B65G 67/606* (2013.01); *E21B 21/066* (2013.01); *B63B 27/28* (2013.01);
(Continued)

(58) Field of Classification Search
CPC ...... E21B 7/12; E21B 15/02; E21B 2021/007; E21B 21/01; B63B 35/28;
(Continued)

(56) References Cited

U.S. PATENT DOCUMENTS 2,207,514 A 7/1940 Haldeman
3,907,147 A 9/1975 Goobeck
(Continued)

*Primary Examiner* — Brad Harcourt
(74) *Attorney, Agent, or Firm* — Brett A. North

(57) ABSTRACT

A method and apparatus for disposing of drill cuttings 500 from an oil and/or gas well drilling platform 510, comprising (a) transporting the drill cuttings 520 to a cuttings collection area 530 on the platform 510; (b) providing a barge 10, the barge 10 having at least one storage area 30, a cover 100 operably connected to the at least one storage area 30, and covering the at least one storage area 30; (c) placing the cover 100 in a first open state so that cuttings 500 can be placed in the at least one storage area 30; (d) transporting the drill cuttings 500 from the cuttings collection area 530 to the at least one storage area of the barge 10; (e) placing the cover 100 in a closed state so that the cuttings 520 in the storage area 30 of the barge 10 are contained; (f) transporting the barge 10 from the drilling platform 510 to a collection site 540; (g) placing the cover 100 in a second open state so that the cuttings 520 in the storage area 30 can be removed; and (h) removing the cuttings 520 from the storage area 30.

20 Claims, 10 Drawing Sheets

Related U.S. Application Data continuation of application No. 13/621,894, filed on Sep. 18, 2012, now Pat. No. 8,528,666, which is a continuation of application No. 13/351,275, filed on Jan. 17, 2012, now Pat. No. 8,267,201, which is a continuation of application No. 13/026,757, filed on Feb. 14, 2011, now Pat. No. 8,096,371, which is a continuation of application No. 12/408,789, filed on Mar. 23, 2009, now Pat. No. 7,886,848, which is a continuation of application No. 11/324,142, filed on Dec. 29, 2005, now Pat. No. 7,506,702.

(60) Provisional application No. 60/640,581, filed on Dec. 30, 2004.

(51) Int. Cl.
  *B65G 67/60* (2006.01)
  *B63B 27/28* (2006.01)
  *B63B 35/44* (2006.01)

(52) U.S. Cl.
  CPC .... *B63B 2035/448* (2013.01); *B65G 2813/00* (2013.01); *B65G 2814/0397* (2013.01); *E21B 21/065* (2013.01)

(58) Field of Classification Search
  CPC . B63B 2035/448; B63B 27/28; B65G 67/606; B65G 2813/00; B65G 2814/0397
  See application file for complete search history.

(56) References Cited

U.S. PATENT DOCUMENTS

| | | |
|---|---|---|
| 5,564,509 A | 10/1996 | Dietzen |
| 5,964,304 A | 10/1999 | Morrison et al. |
| 5,971,084 A | 10/1999 | Dietzen |
| 6,106,733 A | 8/2000 | Wood |
| 6,179,070 B1 | 1/2001 | Dietzen |
| 6,345,672 B1 | 2/2002 | Dietzen |
| 6,585,115 B1 | 7/2003 | Reddoch et al. |
| 6,640,470 B2 | 11/2003 | Chesner et al. |
| 7,506,702 B1 | 3/2009 | Patterson et al. |
| 7,886,848 B1 | 2/2011 | Patterson et al. |
| 8,096,371 B1 | 1/2012 | Patterson et al. |
| 8,267,201 B1 | 9/2012 | Patterson et al. |
| 8,528,666 B1 | 9/2013 | Patterson et al. |
| 9,482,065 B1 * | 11/2016 | Patterson .............. E21B 21/066 |
| 2004/0188433 A1 | 9/2004 | Morales et al. |

* cited by examiner

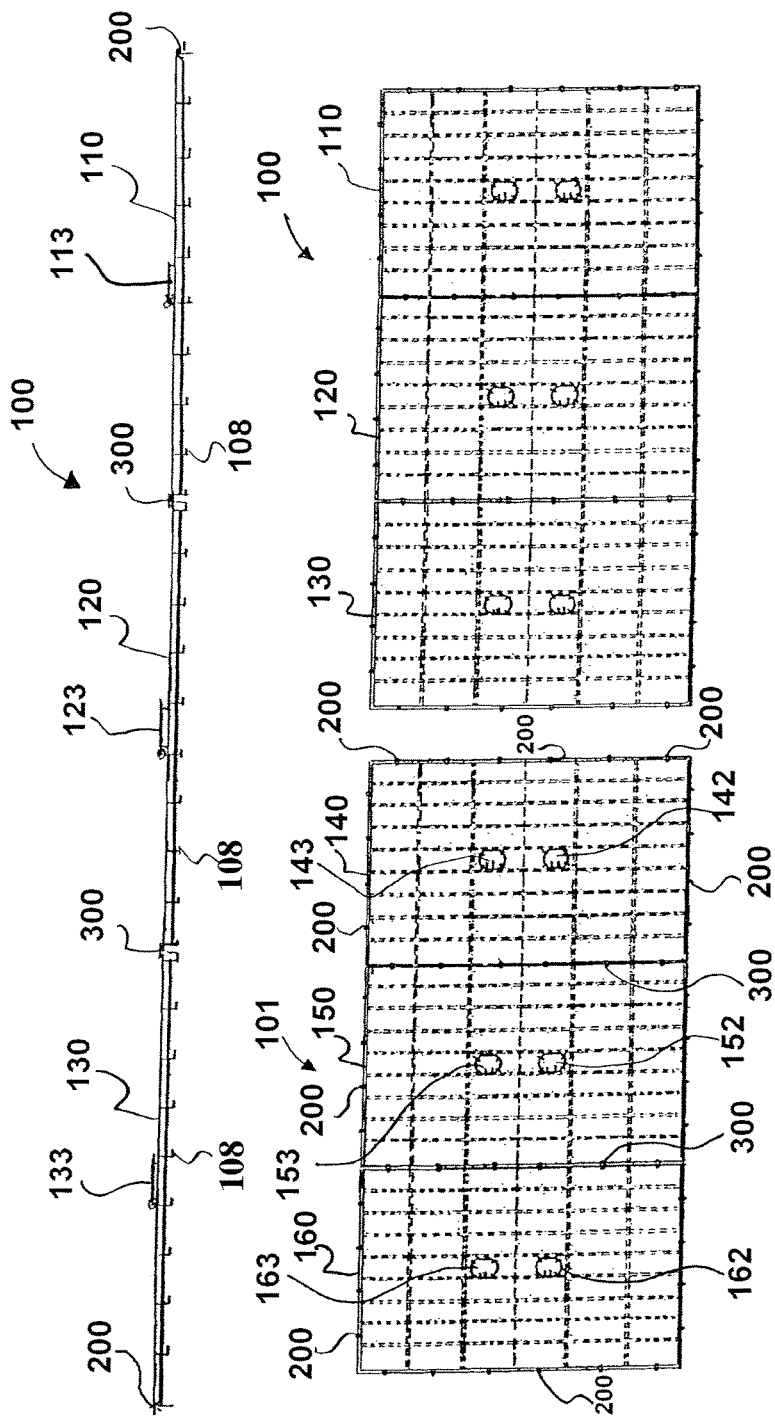

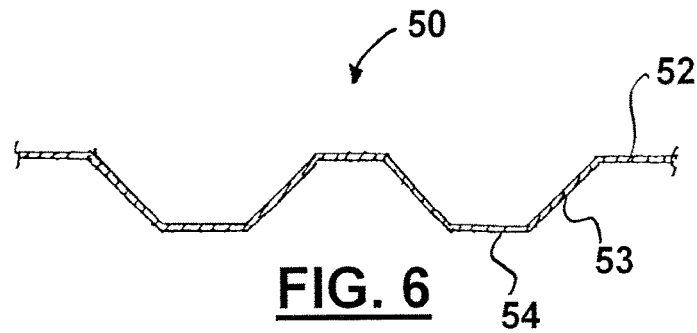
FIG. 6
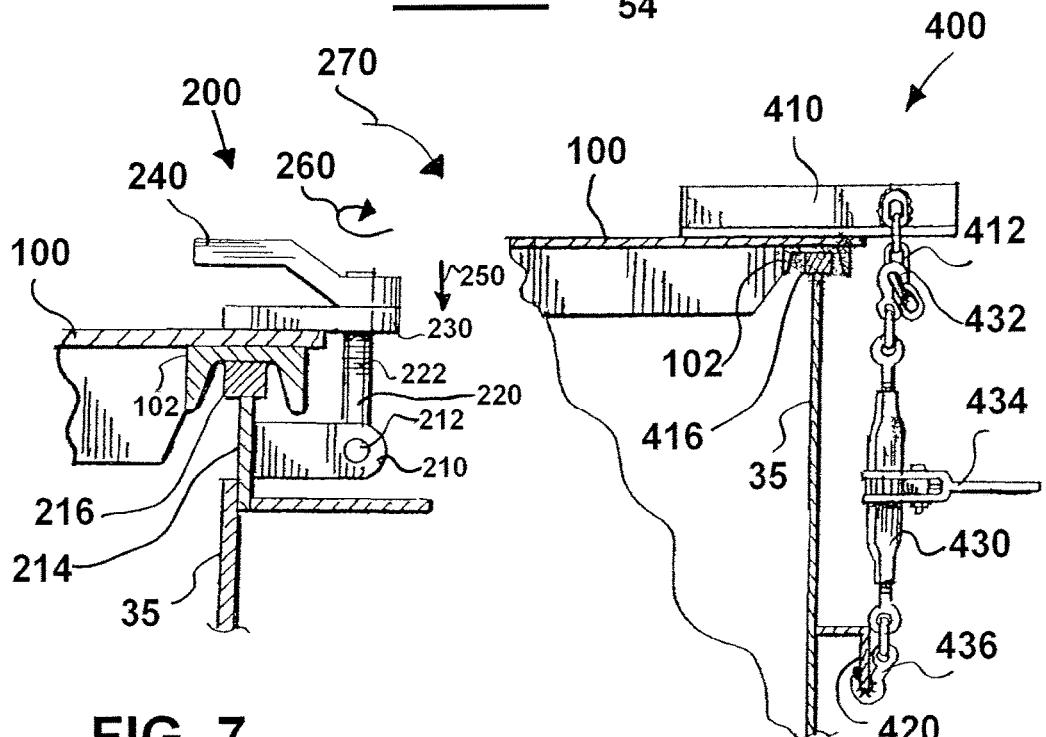
FIG. 7
FIG. 7A
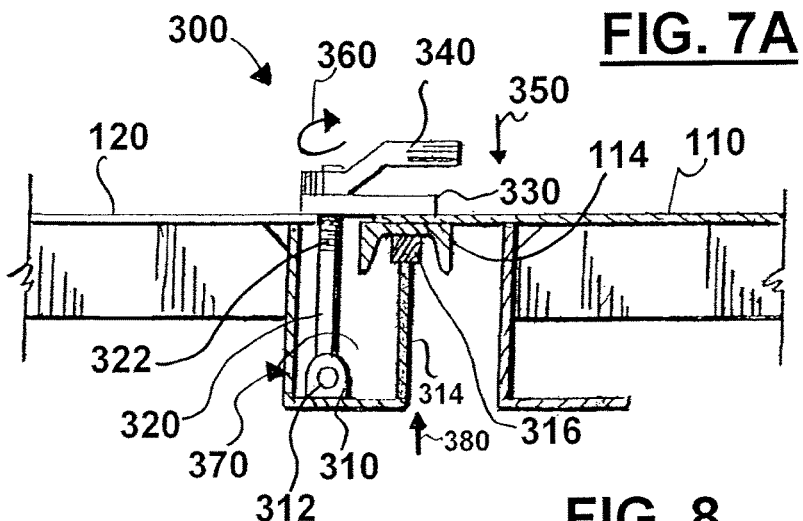
FIG. 8

METHOD AND APPARATUS FOR DISPOSAL OF CUTTINGS

CROSS-REFERENCE TO RELATED APPLICATIONS

This is a continuation of U.S. patent application Ser. No. 14/022,348, filed Sep. 10, 2013 (issuing as U.S. Pat. No. 9,482,065 on Nov. 1, 2016), which is a continuation of U.S. patent application Ser. No. 13/621,894, filed Sep. 18, 2012 (issuing as U.S. Pat. No. 8,528,666 on Sep. 10, 2013), which is a continuation of US patent application Ser. No. 13/351,275, filed Jan. 17, 2012 (issued as U.S. Pat. No. 8,267,201 on Sep. 18, 2012) which is a continuation of U.S. patent application Ser. No. 13/026,757, filed Feb. 14, 2011 (issued as U.S. Pat. No. 8,096,371 on Jan. 17, 2012) which is a continuation of U.S. patent application Ser. No. 12/408,789, filed Mar. 23, 2009 (issued as U.S. Pat. No. 7,886,848 on Feb. 15, 2011), which application is a continuation of U.S. patent application Ser. No. 11/324,142, filed Dec. 29, 2005 (issued as U.S. Pat. No. 7,506,702 on Mar. 24, 2009) which is a non-provisional of U.S. patent application Ser. No. 60/640,581, filed Dec. 30, 2004.

Each of these applications are incorporated herein by reference. Priority of each of these applications is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND

The present invention relates to the disposal of the cuttings from oil and gas well drilling, and more particularly to an improved method and apparatus for the disposal of cuttings generated during drilling of an oil and gas well. More particularly, the present invention relates to a method and apparatus for disposal of cuttings generated during the drilling of an oil and gas well using a barge wherein an improved configuration enhances the storage, transportation, and ultimate disposal of cuttings.

In the drilling of oil and gas wells, a drill bit is used to dig many thousands of feet into the earth's crust. Oil rigs typically employ a derrick that extends above the well drilling platform which can support joint after joint of drill pipe connected end to end during the drilling operation. As the drill bit is pushed farther and farther into the earth, additional pipe joints are added to the ever lengthening "string" or "drill string." The drill pipe or drill string thus comprises a plurality of joints of pipe, each of which has an internal, longitudinally extending bore for carrying fluid drilling mud from the well drilling platform through the drill string and to a drill bit supported at the lower or distal end of the drill string.

Drilling mud lubricates the drill bit and carries away well cuttings generated by the drill bit as it digs deeper. The cuttings are carried in a return flow stream of drilling mud through the well annulus and back to the well drilling platform at the earth's surface. When the drilling mud reaches the surface, it is contaminated with small pieces of shale and rock which are known in the industry as well cuttings or drill cuttings.

Well cuttings have in the past been separated from the reusable drilling mud with commercially available separators that are know as "shale shakers." Some shale shakers are designed to filter coarse material from the drilling mud while other shale shakers are designed to remove finer particles from the drilling mud. After separating well cuttings therefrom, the drilling mud is returned to a mud pit where it can be supplemented and/or treated prior to transmission back into the well bore via the drill string and drill bit to repeat the process.

The disposal of the separated shale and cuttings is a complex environmental problem. Drill cuttings contain not only the mud product which would contaminate the surrounding environment, but also can contain oil that is particularly hazardous to the environment, especially when drilling in a marine environment.

Traditional methods of cuttings disposal have been by individual storage tanks, dumping, bucket transport, cumbersome conveyor belts, and washing techniques that require large amounts of water. Adding water creates additional problems of added volume and bulk, messiness, and transport problems. Installing conveyors requires major modification to the rig area and involves many installation hours and very high cost.

In the Gulf of Mexico for example, there are hundreds of drilling platforms that drill for oil and gas by drilling into the subsea floor. These drilling platforms can be in many hundreds of feet of water. In such a marine environment, the water is typically crystal clear and filled with marine life that cannot tolerate the disposal of drill cuttings waste such as that containing a combination of shale, drilling mud, oil, and the like. Therefore, there is a need for a simple, yet workable solution to the problem of disposing of oil and gas well cuttings in an offshore marine environment and in other fragile environments where oil and gas well drilling occurs.

Open top barges are not approved by the Coast Guard for use in the Gulf of Mexico because of the risk of discharges into the environment.

Prior art tank systems have included tanks with hatch openings into which drill cuttings can be placed. These prior art tanks also have attachments for enabling lift lines to be affixed to the tank so that it can be transported to and from offshore platforms and emptied when full. Further examples of these tanks are shown in one or more of the following U.S. Pat. Nos. 5,971,084; 5,564,509; and 5,402,857, which are each incorporated herein by reference. Although these tanks address the risk of discharge of drill cuttings into the environment, the tanks suffer from the disadvantage that they must be individually filled and emptied. Additionally, the tanks must be loaded onto the transporting vessel before being filled with cuttings, transported to the disposal site, off loaded from the transported vessel, and then cuttings from each tank are unloaded individually. This is a time consuming and cost prohibitive process.

There is a need for a system which allows fast and economical transport and disposal of drill cuttings from a drilling rig.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

The apparatus of the present invention solves the problems confronted in the art in a simple and straightforward manner. In one embodiment is provided an improved method and apparatus for storage, transportation, and disposal of cuttings.

In one embodiment an improved barge is provided which includes a removable cover.

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 4 is a section view taken along the line 4-4 of FIG. 3;

FIG. 5 is a top view of two covers which can be used on the barge of FIG. 1;

FIG. 6 is an enlarged sectional view of the interior support shown in circle 6 of FIG. 1;

FIG. 7 is a side view of a locking unit;

FIG. 7A is a side view of an alternative locking unit;

FIG. 8 is a side view of a locking unit;

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
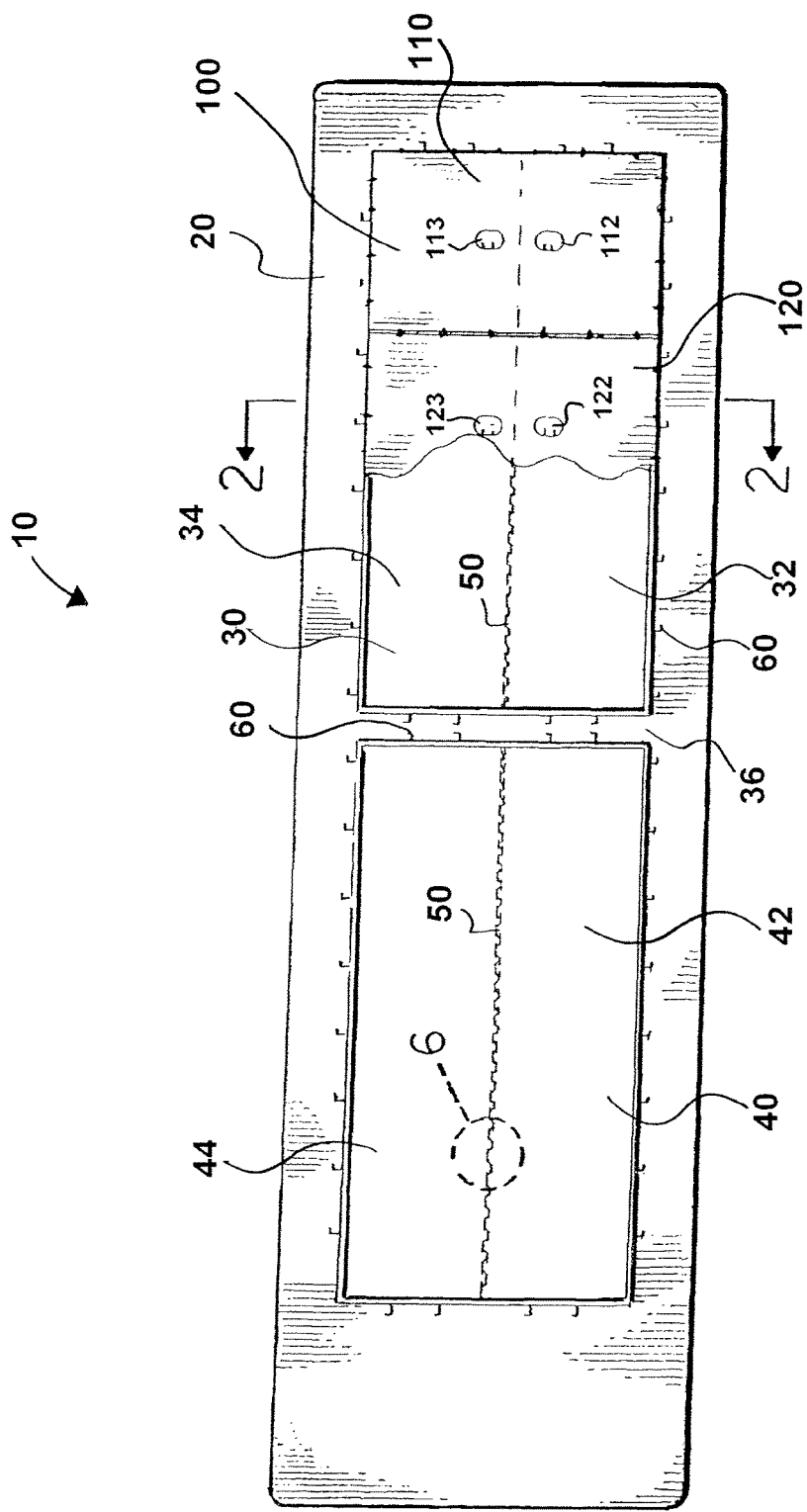
FIG. 1 is a top schematic view of a barge which can be used in one embodiment.

FIG. 1 is a top schematic view of a barge 10 which can be used in the method and apparatus of the present invention.

Figure 2:
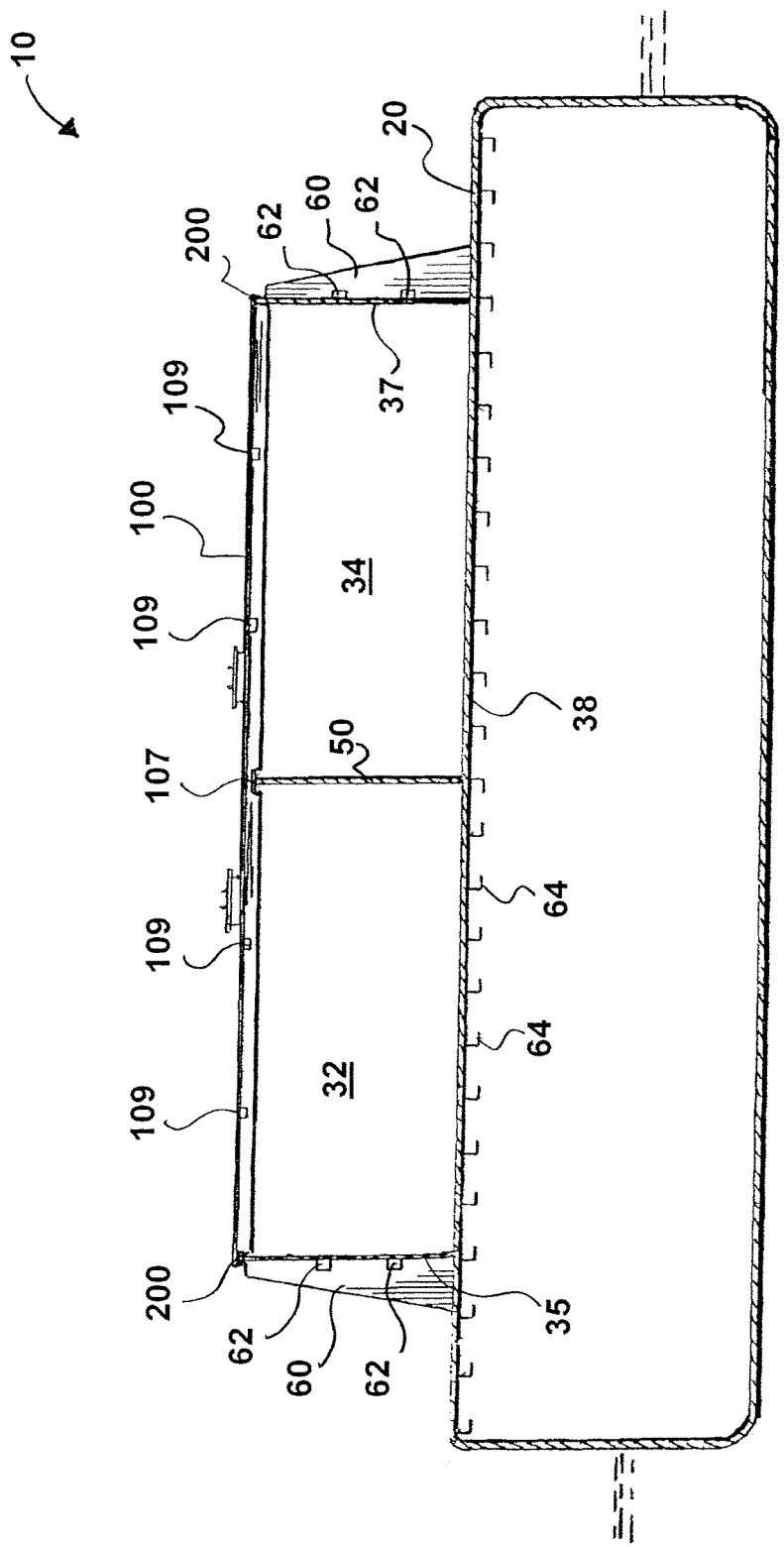
FIG. 2 is a sectional view taken along the line 2-2 of FIG. 1.
Figure 3:
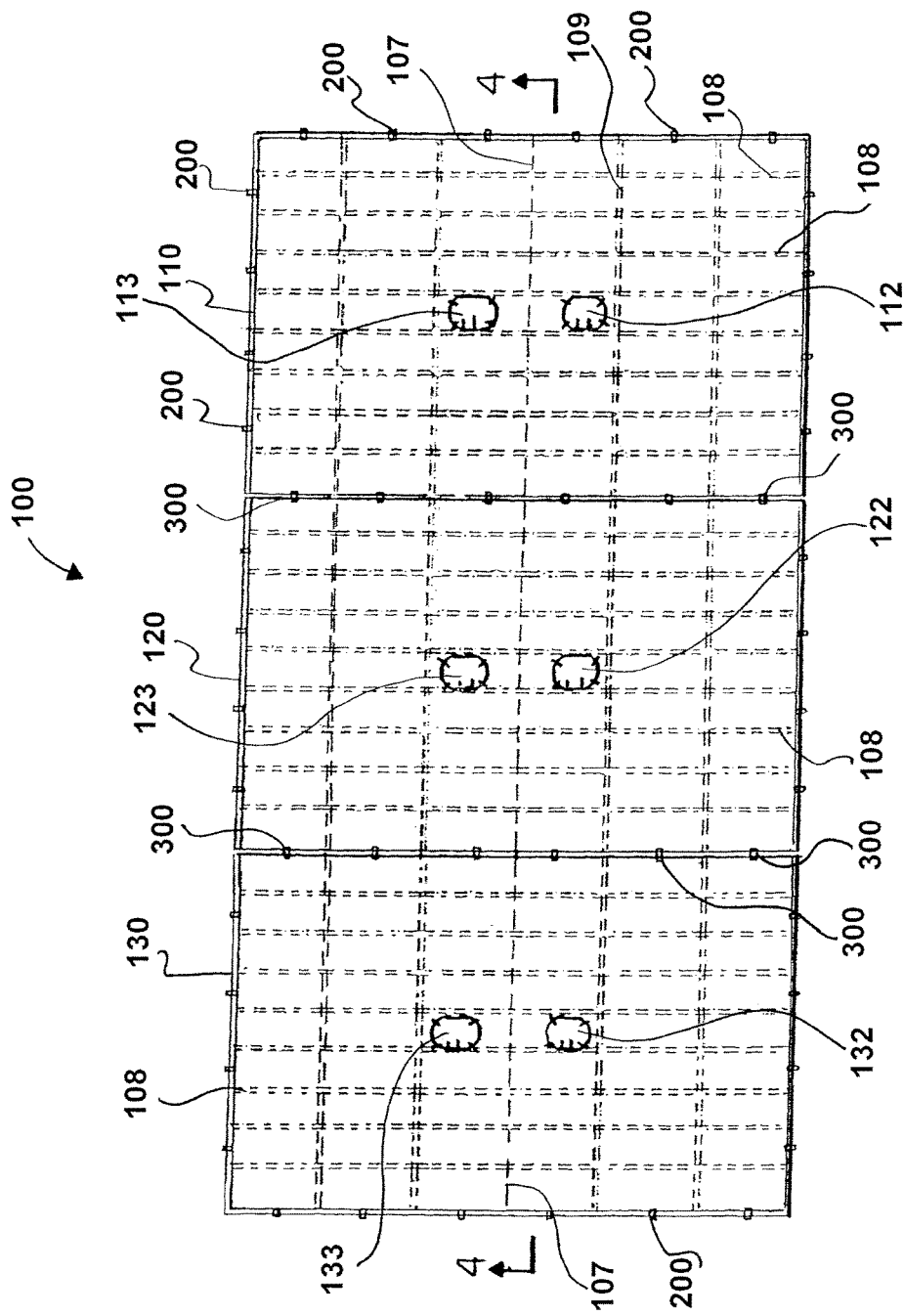
FIG. 3 is a top view of a cover which can be used on the barge of FIG. 1.

FIG. 2 is a sectional view taken along the line 2-2 of FIG. 1. FIG. 3 is a top view of a cover 100 which can be used on barge 10. FIG. 4 is a sectional view taken along the line 4-4 of FIG. 3. FIG. 5 is a top view of two sections of cover 100 which can be used on barge 10.

Generally, barge 10 can comprise base 20, at least one compartment 30, and cover 100. Cover 100 can include at least one hatch 122. In FIG. 1, barge 10 is shown having two compartments 30,40 which are physically separated by space 36. Having more than one compartment is optional and separating the compartments by space 36 is also optional. Having two or more hatches 122, 123 is also optional.

In one embodiment cover 100 can be comprised of cover plates 110,120,130. Each cover plate can respectively include hatches 112 and 113; 122 and 123; and 132 and 133. In one embodiment cover 101 can be comprised of cover plates 140,150,160. Each cover plate can respectively include hatches 142 and 143; 152 and 153; and 162 and 163. Hatches 112, 113,122,123,132,133,142,143,152,153,162, 163 are shown being elliptical in shape, but can be any shape including polygonal, circular, rectangular, or square. Alternatively, only one hatch may be included. Also alternatively, two or more hatches per cover plate may be included. It is preferable that each hatch include a watertight seal.

Figure 3A:
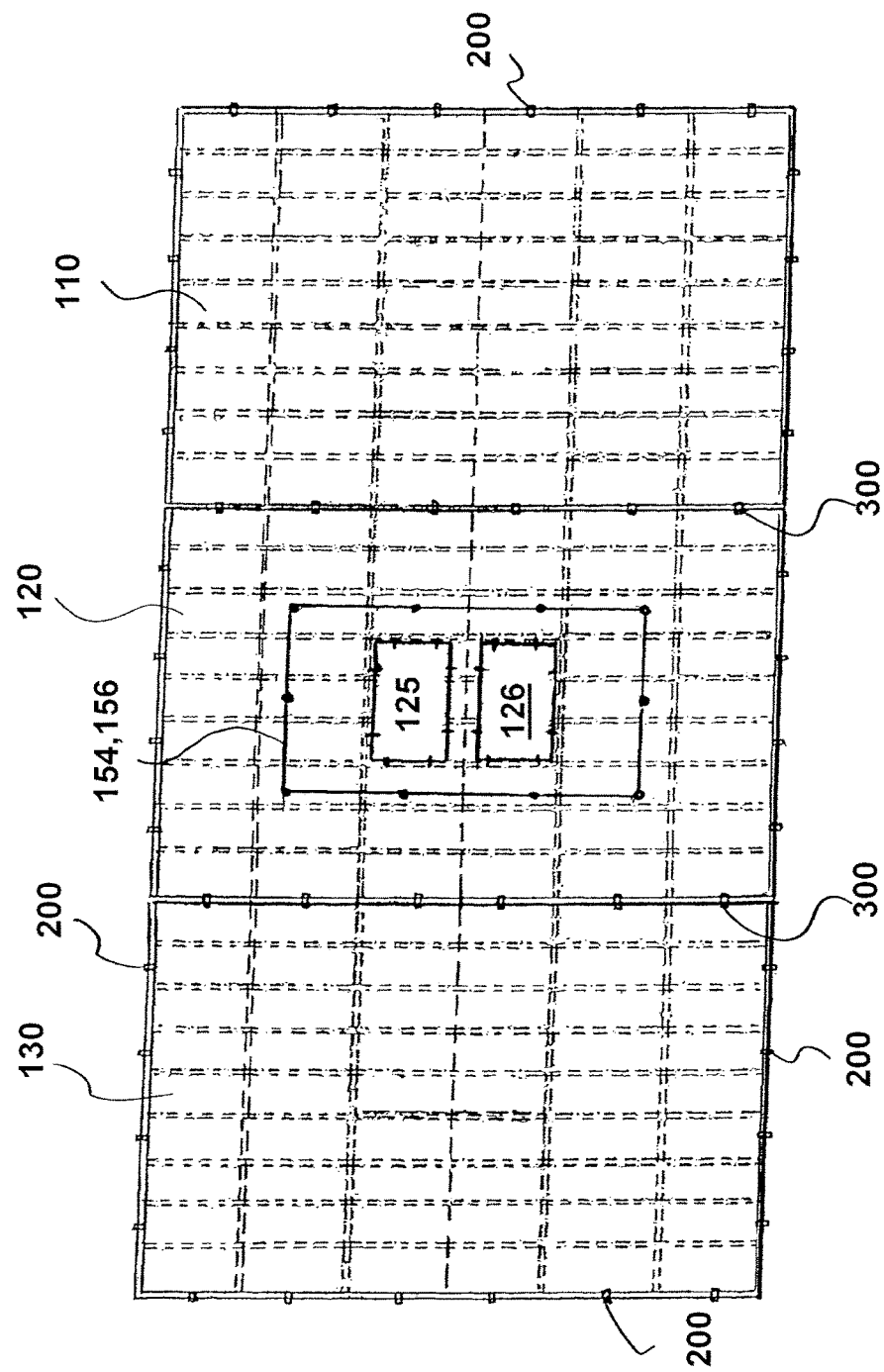
FIG. 3A is a top view of an alternative cover which can be used on the barge of FIG. 1.

In one embodiment the hatches can be rectangular of 4 feet by 6 feet (see FIG. 3A). A handrail 156 can be included on cover 100. Additionally, a secondary containment system 154 can be used around the plurality of hatches 125,126 so that spillage from discharge pipe 512 can be contained.

Including multiple cover plates reduces the weight which must be overcome in removing the cover plates. However, increasing the number of cover plates will increase the amount of watertight seals which are made at the joints (between cover plates). In one embodiment cover plates can be supported by a plurality of channel or angle supports 108 and channel or angle supports 109. In one embodiment cover plates can include a center support 107 (see FIGS. 2 through 5).

In one embodiment compartment 30 can be comprised of sub-compartments 32,34. Interior support 50 can separate compartment 30 into sub-compartments 32,34. Similarly, interior support 50 can separate compartment 40 into sub-compartments 42,44. FIG. 6 is an enlarged sectional view of interior support 50. Interior support 50 can comprise upper surface 52, inclined surface 53, and lower surface 54. Interior support 50 can support support 107.

FIG. 2 shows a side view of compartment 30. Compartment 30 can be comprised of sidewall 35, floor 38, and sidewall 37. Compartment 30 can include sub-compartments 32,34. Sidewalls 35,37 can be supported by supports 60, 62. Floor 38 can be supported by lower supports 64.

In one embodiment cover 100 can be detachably connected to compartment 30 through detaching a plurality of locks 200. In one embodiment lock 200 is constructed as shown in FIG. 7. Lock 200 can comprise base 210, pivot 212, member 214, threaded shaft 220, arm 230, and handle 240. Handle 240 can be threadably connected to threaded shaft 220 through threads 222. Threaded shaft 220 can be pivotally connected to base 210 through pivot 212. Base 210 can be connected to member 214. Seal 216 can be attached to member 214 or channel 102. Handle 240 can be turned in the direction of arrow 260 causing arm 230 to push down on cover 100 in the direction of arrow 250. Cover 100 can include channel 102 and, as cover 100 is pushed in the direction of arrow 250, seal 216 is squeezed between channel 102 and member 214 creating a watertight connection.

To release cover 100, handle 240 is rotated in the opposite direction of arrow 260 allowing arm 230 to move in the opposite direction of arrow 250. When loosened handle 240 can be pulled back in the direction of arrow 270 (causing threaded shaft 220 to pivot in the same direction about pivot 212) which removes arm 230 from cover 100.

In an alternative embodiment cover 100 can be detachably connected to compartment 30 through detaching a plurality of locks 400 (taking the place of locks 200). In one embodiment lock 400 is constructed as shown in FIG. 7A. Lock 400 can comprise upper portion 410, chain 412, lower portion 420, ratcheting portion 430, connector 432, handle 434, and connector 436. Connector 420 can be attached to side wall 35. Connector 436 can be attached to connector 420, such as by welding. Upper portion 410 can be attached to cover 100 and include chain 412. Connector 432 can be detachably connectable to chain 412. Handle 434 can be used to ratchet down connector 432 to chain 412 and make a tight connection. To release cover 100, handle 434 can be ratcheted to loosen connector 432 from chain 412. The ratcheting portion 430 of connector 400 can then hang from lower portion 420.

In one embodiment cover plates (such as cover plates 110,120) can be detachably connected to each other through detaching a plurality of locks 300. In one embodiment lock 300 is constructed as shown in FIG. 8. Lock 300 can comprise base 310, pivot 312, member 314, threaded shaft 320, arm 330, and handle 340. Handle 340 can be threadably connected to threaded shaft 320 through threads 322. Threaded shaft 320 can be pivotally connected to base 310 through pivot 312. Base 310 can be connected to member 314. Seal 316 can be attached to member 314 or channel 114. Handle 340 can be turned in the direction of arrow 360 causing arm 330 to push down on cover plate 110 in the direction of arrow 350. Cover plate 120 can include lock 300. Cover plate 110 can include channel 114 and as cover plate 110 is pushed in the direction of arrow 350 (and member 314 is pulled in the direction of arrow 380) causing seal 316 to be squeezed between channel 114 and member 314 creating a watertight connection. To release cover plates 110,120; handle 340 is rotated in the opposite direction of arrow 360 allowing arm 330 to move in the opposite direction of arrow 350. When loosened arm 340 can be pulled back in the direction of arrow 370 (causing threaded shaft 320 to pivot in the same direction about pivot 312) which removes arm 330 from cover plate 110.

In one embodiment cover 100 comprises at least one hatch 112 which can be opened and closed, and the first open state in step "c" occurs when hatch 112 is opened. In one embodiment cover 100 is detachably connected to the barge 10, and the second open state in step "g" occurs when cover 100 is removed from barge 10 (such as by a crane 550). In another embodiment the first open state occurs when cover 100 is removed from barge 10 (such as by a crane 550). In one embodiment, cover 100 comprises a plurality of hatches 125, 126 which can be rectangular of 4 feet by 6 feet. In one embodiment during step "h" the cuttings 520 are scooped out of the storage area 30. In one embodiment a bucket 560 or backhoe 561 is used to scoop out the cuttings 520. In one embodiment during step "h" the cuttings 520 are dug out of the storage area 30. In one embodiment cover 100 is detachably connected to the storage area 30 by a plurality of anchors or locks 200. In one embodiment cover 100 comprises a plurality of pad eyes 560 which can be used to lift the cover 100.

In one embodiment cover 100 comprises a plurality of sections 110,120,130, each section being connected to the at least one storage area by a plurality of anchors or locks 200.

In one embodiment the plurality of sections 110,120,130 are detachably connected to at least one other of the plurality of sections and seals 316 are used to seal the connection area between the detachably connected sections. In one embodiment there exists a watertight seal 216 between the storage area 30 and the cover 100. In one embodiment the first and second open states occur when at least one of the sections are removed from barge 10. In another embodiment either the first or second open states occurs when at least one of the sections are removed from barge 10.

In one embodiment cover 101 comprises a plurality of sections 140,150,160, each section being connected to the at least one storage area by a plurality of anchors or locks 200 (or locks 400). In one embodiment the plurality of sections 140,150,160 are detachably connected to at least one other of the plurality of sections and seals 316 are used to seal the connection area between the detachably connected sections. In one embodiment there exists a watertight seal 216 between the storage area 40 and the cover 101. In one embodiment the first and second open states occur when at least one of the sections are removed from barge 10. In another embodiment either the first or second open states occurs when at least one of the sections are removed from barge 10.

In one embodiment cover 100 is rotatably connected to the at least one storage area 30. In one embodiment the cover 100 is slidably connected to the at least one storage area 30. For example cover plate 120 can slide under or over cover plate 130 to open storage area 30.

In one embodiment, compartments 30,40 occupy at least fifty percent of the area of barge 10. In another embodiment, compartments 30,40 occupy between about fifty percent to ninety five percent of the area of barge 10. In another embodiment, compartments 30,40 occupy between fifty and seventy five percent of the area of barge 10. In another embodiment, compartments 30,40 occupy between seventy five and ninety five percent of the area of barge 10.

Method

One embodiment includes a method of disposing of drill cuttings 500 from an oil and/or gas well drilling platform 510, comprising: (a) transporting the drill cuttings 520 to a cuttings collection area 530 on the platform 510; (b) providing a barge 10, the barge 10 having at least one storage area 30 (which may be integrally formed with barge 10), a cover 100 operably connected to the at least one storage area 30, and covering the at least one storage area 30; (c) placing the cover 100 in a first open state so that cuttings 500 can be placed in the at least one storage area 30; (d) transporting the drill cuttings 500 from the cuttings collection area 530 to the at least one storage area of the barge 10; (e) placing the cover 100 in a closed state so that the cuttings 520 in the storage area 30 of the barge 10 are contained; (f) transporting the barge 10 from the drilling platform 510 to a collection site 540; (g) placing the cover 100 in a second open state so that the cuttings 520 in the storage area 30 can be removed; and (h) removing the cuttings 520 from the storage area 30.

Figure 9:
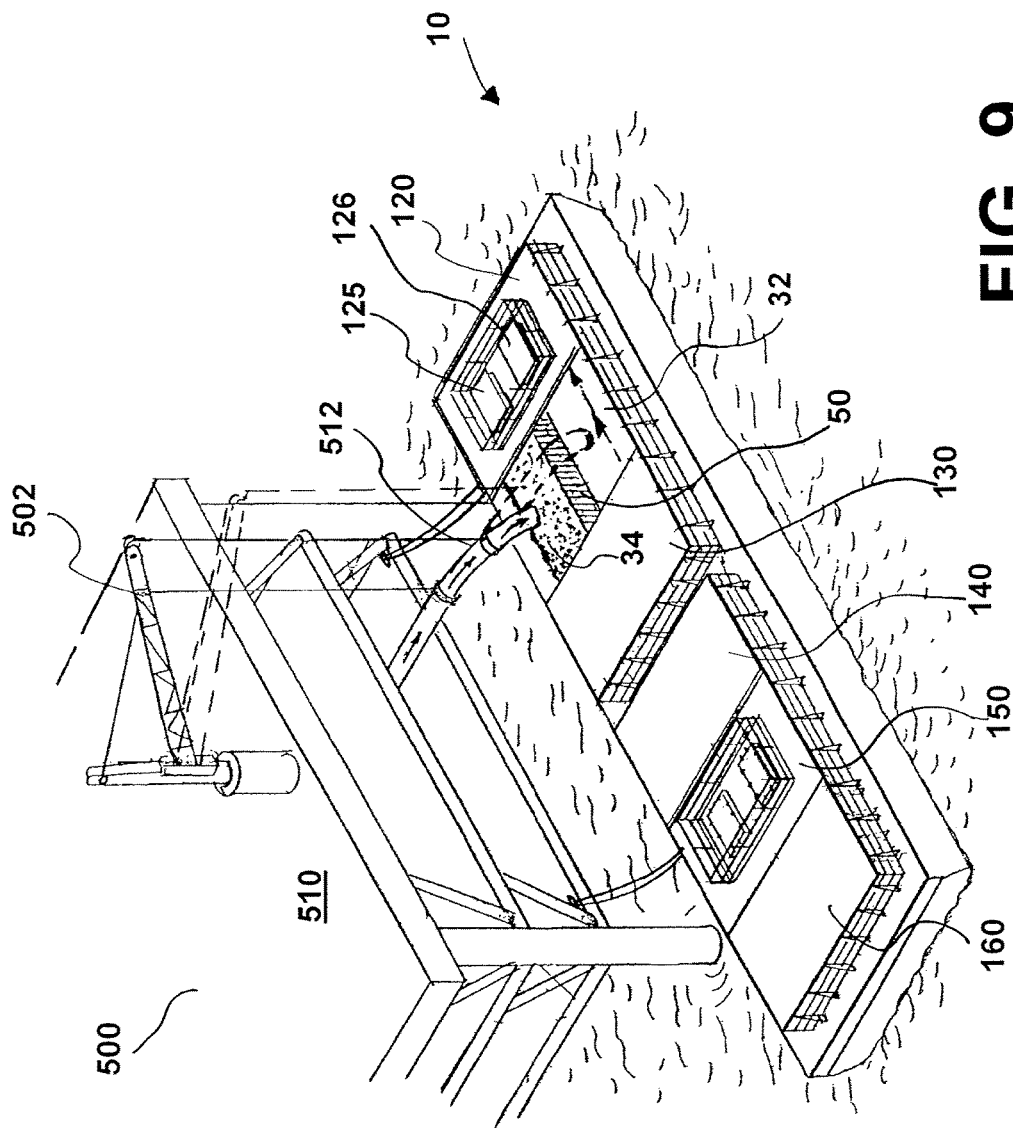
FIG. 9 is a perspective view of a discharge pipe after it has filled one of the sub-compartments (with a portion of the cover removed)
Figure 10:
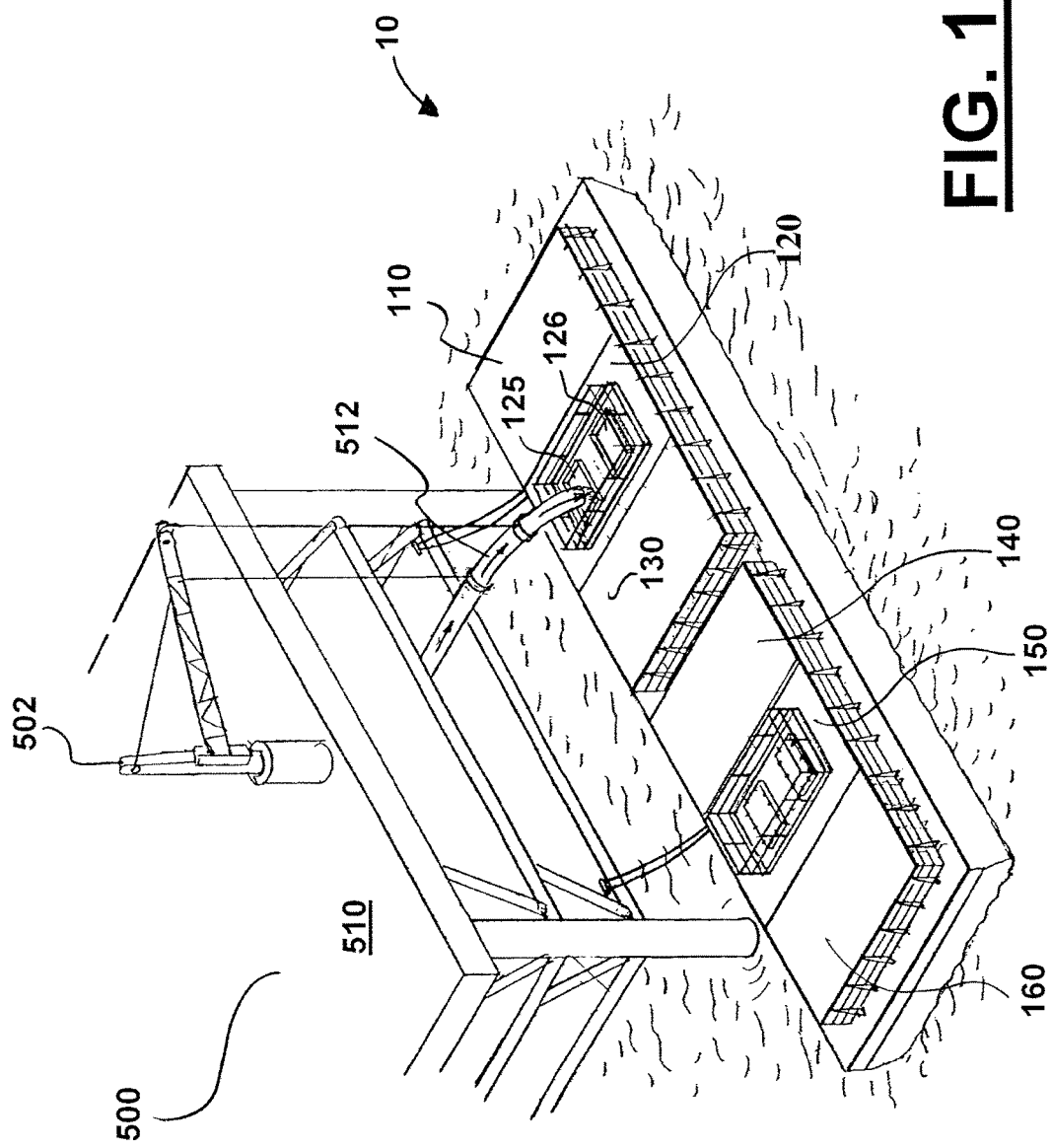
FIG. 10 is a perspective view of a discharge pipe filling one of the sub-compartments (through a hatch cover opening)

FIG. 9 is a perspective view of a discharge pipe 512 after it has filled one of the sub-compartments 32 (with middle section 120 of cover 100 removed and placed on side compartment 110). Also shown is wall 50 and empty sub-compartment 34. After completion of the filling of sub-compartment 32, discharge pipe 512 can be located to fill sub-compartment 34—as indicated by the phantom lines in FIG. 9. While sub-compartments 32,34 are being filled, middle cover 120 has been removed and placed on top of side compartment 110. FIG. 10 is a perspective view of discharge pipe 512 filling subcompartment 32 through hatch 125. After filling sub-compartment 32, sub-compartment 34 can be filled through hatch 126. Alternatively, one or more openings can be included in wall 50 to allow movement between sub-compartments 32 and 34. Also alternatively wall 50 can be removed completely. In such alternative embodiments a single hatch could be used to fill compartment 30.

In one embodiment discharge pipe 512 can be operably connected to barge 10 through a connection to one of the hatches. This connection can be a swivel type quick connection or a funnel connection. The connection should allow for differential movement between barge 10 and rig 500 depending on the sea conditions. Operably connecting discharge pipe 512 saves time and reduces the risk of spillage.

After being filled barge 10 can be taken to an ultimate disposal or recycling site or to a transfer station where its contents can be transferred to means to transport the contents to the ultimate disposal or recycling site. A tug 600 can be used to move barge 10 to a desired location.

Figure 11:
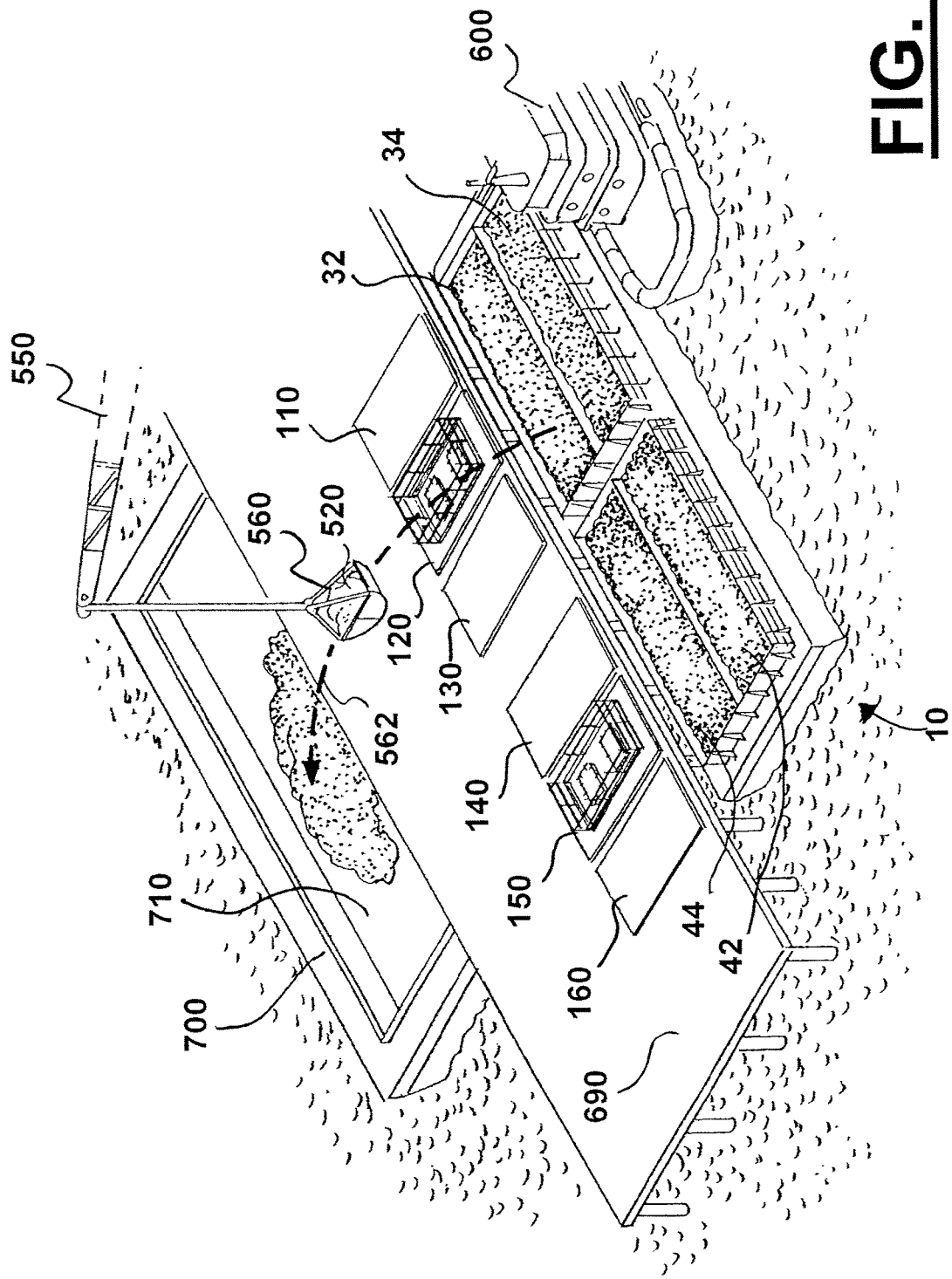
FIG. 11 is a perspective view of a barge being unloaded at a transfer station where its contents are being transferred to a transfer barge.
Figure 12:
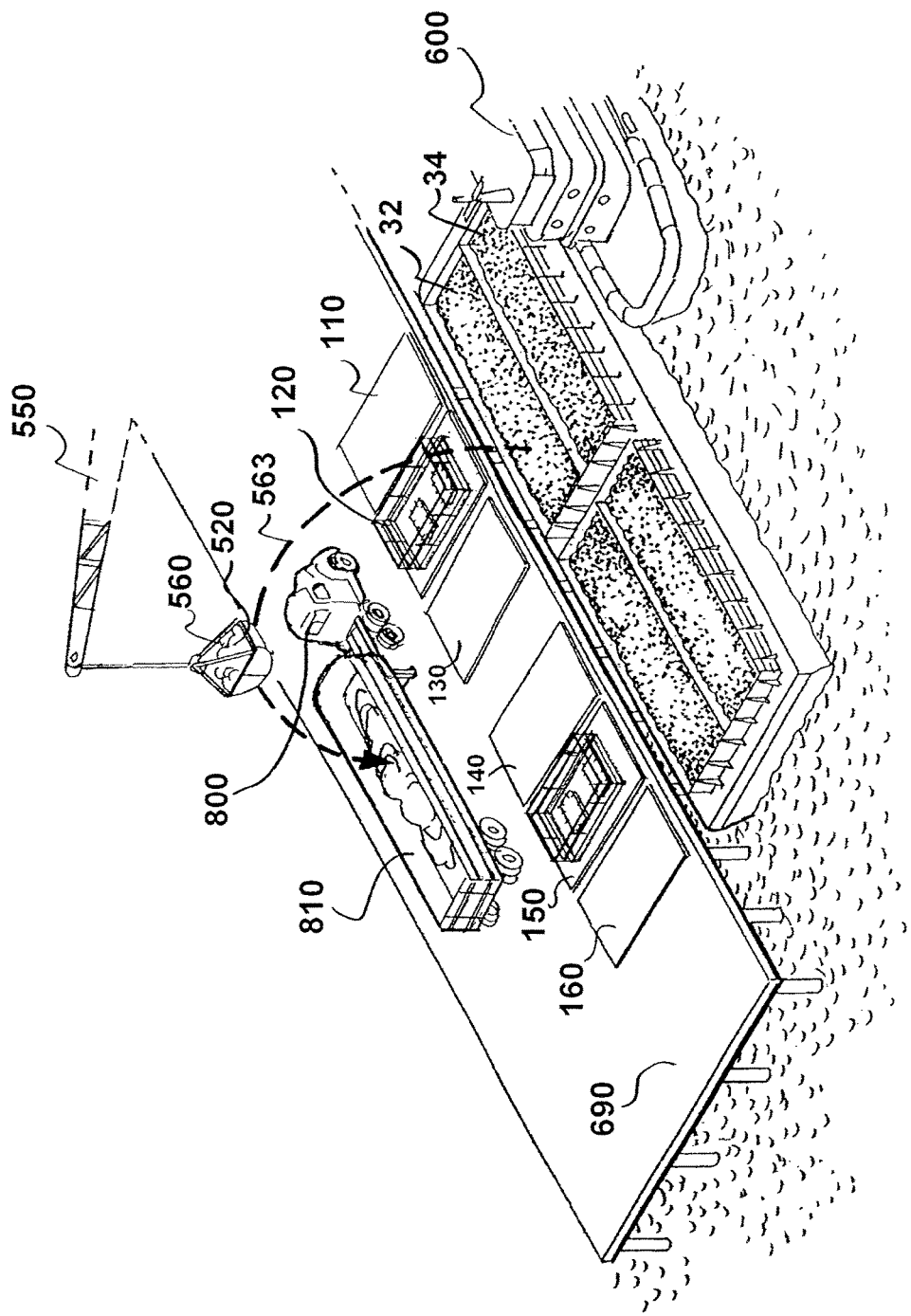
FIG. 12 is a perspective view of a barge being unloaded at a transfer station where its contents are being transferred to a truck.

FIG. 11 is a perspective view of barge 10 being unloaded at transfer station 690 where its contents are being transferred to transfer barge 700. FIG. 12 is a perspective view of barge 10 being unloaded at transfer station 690 where its contents are being transferred to a truck 800. To remove covers 101,102 the plurality of locks 200 or 400 (depending on the locking embodiment chosen) can be loosened. Crane 550 can be used to remove covers 101 and 102 from barge 10 and place covers 101,102 on transfer station 690. Cover plates 110,120,130,140,150,160 are shown in FIGS. 11 and 12 on transfer station 690.

Various methods can be used to remove the contents of barge 10. In FIGS. 11 and 12 a clam bucket 560 is shown unloading barge 10. Clam bucket 560 can be controlled by crane 550. Clam bucket 560 can scoop out a portion of material, such as drill cuttings 520. In FIG. 11, transfer barge 700 is shown being located on the opposite side of transfer station 690. Although not shown a tray 730 can be placed between barge 10 and transfer station 690 to catch any spillage from clam bucket 560. Alternatively, transfer barge can be located adjacent to barge 10. Spanning between top 720 of transfer barge 700 and barge 10 can be tray 730. Tray 730 can include splash guard 740. Tray 730 catches any material such as drill cuttings 520 which might spill from clam bucket 560. Tray 730 is shown angled toward barge 10 so that spilled material will flow back to barge 10, however, tray 730 could also be angled toward transfer barge 700. After being filled transfer barge 700 can be moved to an ultimate disposal site, such as a land fill, land farm, or injection well.

As shown in FIG. 12, truck 800 can be filled with the contents of barge 10. After being filled transfer truck 800 can driven to an ultimate disposal site, such as a land fill, land farm, or injection well. In one embodiment multiple trucks can be used to empty barge 10. In one embodiment both trucks and transfer barges can be used to empty barge 10.

In an alternative embodiment a backhoe 561 can be used to empty all or part of the contents of barge 10. In an alternative embodiment at least part of barge 10 is emptied by pumping out its contents. In one embodiment both pumping and bucket 560 are used. In an alternative embodiment at least part of barge 10 is manually emptied, such as by shovels.

In an alternative embodiment, barge 10 can be moved by tug boat 600 to the ultimate disposal site for unloading.

After being emptied, covers 101,102 can again be placed on barge 10, such as by crane 550. In one embodiment covers 101,102 are locked down for further transport of barge 10.

The following is a list of reference numerals:

| LIST FOR REFERENCE NUMERALS | |
|---|---|
| (Reference) | (Description) |
| 10 | barge |
| 20 | base |
| 30 | compartment |
| 32 | sub-compartment |
| 33 | wall |
| 34 | sub-compartment |
| 35 | wall |
| 36 | space |
| 37 | wall |
| 38 | floor |
| 40 | compartment |
| 42 | sub-compartment |
| 44 | sub-compartment |
| 50 | interior support |
| 52 | upper surface |
| 53 | inclined surface |
| 54 | lower surface |
| 60 | support |
| 62 | support |
| 64 | lower support |
| 100 | cover |
| 101 | cover |
| 102 | channel |
| 104 | section of cover |
| 106 | section of cover |
| 107 | support |
| 108 | channel or angle support |
| 109 | channel or angle support |
| 110 | cover plate |
| 112 | hatch |
| 113 | hatch |
| 120 | cover plate |
| 122 | hatch |
| 123 | hatch |
| 124 | containment ring |
| 125 | hatch |
| 126 | hatch |
| 130 | cover plate |
| 132 | hatch |
| 133 | hatch |
| 134 | vent |
| 140 | cover plate |
| 142 | hatch |
| 150 | cover plate |
| 152 | hatch |
| 154 | secondary containment |
| 156 | guard rail |
| 160 | cover plate |
| 162 | hatch |
| 200 | lock |
| 210 | base |
| 212 | pivot |
| 214 | member |
| 216 | seal |
| 220 | threaded shaft |
| 222 | threads |
| 230 | arm |
| 240 | handle |
| 250 | arrow |
| 260 | arrow |
| 270 | arrow |
| 300 | lock |
| 310 | base |
| 312 | pivot |
| 314 | member |
| 316 | seal |
| 320 | threaded shaft |
| 322 | threads |
| 330 | arm |
| 340 | handle |

LIST FOR REFERENCE NUMERALS

| (Reference) | (Description) |
|---|---|
| 350 | arrow |
| 360 | arrow |
| 370 | arrow |
| 380 | arrow |
| 400 | lock |
| 410 | upper portion |
| 412 | chain |
| 416 | seal |
| 420 | lower portion |
| 430 | ratcheting portion |
| 432 | connector |
| 434 | handle |
| 436 | connector |
| 500 | rig |
| 502 | rig crane |
| 510 | platform |
| 512 | discharge pipe |
| 520 | drill cuttings |
| 530 | collection area |
| 540 | collection site |
| 550 | crane |
| 560 | bucket |
| 561 | backhoe |
| 562 | arrow |
| 563 | arrow |
| 600 | tug boat |
| 610 | arrow |
| 690 | transfer station |
| 700 | transfer barge |
| 710 | open compartment |
| 720 | top |
| 730 | tray |
| 740 | splash guard |
| 800 | truck |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

We claim:

1. A method of disposing of drill cuttings from an oil and/or gas well drilling platform, comprising:
   (a) providing a barge, the barge having a first storage area, a first cover comprising a plurality of covers positioned adjacent each other;
   (b) placing the first storage area in a first open state by moving one or more cover plates so that cuttings can be placed in the first storage;
   (c) receiving cuttings in the barge's first and second storage areas from the drilling platform;
   (d) placing the first storage area in a closed state by positioning the plurality of covers adjacent each other over the first storage area so that the cuttings in the storage area are contained;
   (e) transporting the barge from the drilling platform to a collection site;
   (f) placing the first storage area in a second open state so that the cuttings can be removed, the second open state having a larger open area compared to the first open state wherein more of the cover plates are moved in the second open state then were moved in step "b";
   (g) removing the cuttings from the barge's first storage area; and
   (h) during steps "b" through "g" the first storage area is at atmospheric pressure.

2. The method of disposing of drill cuttings of claim 1, wherein in step "a" the cover comprises a hinged hatch which can be opened and closed, and the first open state in step "b" occurs when the hatch is opened.

3. The method of disposing of drill cuttings of claim 1, wherein the cover is detachably connected to the barge, and the second open state in step "f" occurs when the cover is removed from the barge.

4. The method of disposing of drill cuttings of claim 1, wherein in step "b" the barge includes a second storage area and a second cover operably connected to the second storage area.

5. The method of disposing of drill cuttings of claim 1, wherein in step "g" the cuttings are scooped out of the at least one storage area.

6. The method of disposing of drill cuttings of claim 5, wherein a backhoe is used to scoop out the cuttings.

7. The method of disposing of drill cuttings of claim 5, wherein a clam bucket is used to scoop out the cuttings.

8. The method of disposing of drill cuttings of claim 1, wherein in step "g" the cuttings are dug out of the at least one storage area.

9. The method of disposing of drill cuttings of claim 1, wherein in step "a" the cover is detachably connected to the at least one storage area by a plurality of anchors.

10. The method of disposing of drill cuttings of claim 9, wherein the cover comprises a plurality of pad eyes which can be used to lift the cover.

11. The method of disposing of drill cuttings of claim 1, wherein in step "a" the cover comprises a plurality of sections, each section being connected to the at least one storage area by a plurality of anchors.

12. The method of disposing of drill cuttings of claim 11, wherein at least one of the plurality of sections are detachably connected to at least one other of the plurality of sections and a seal is used to seal the connection area between the detachably connected sections.

13. The method of disposing of drill cuttings of claim 1, wherein in step "a" there exists a watertight seal between the at least one storage area and the cover.

14. The method of disposing of drill cuttings of claim 1, wherein in step "a" the cover is rotatably connected to the at least one storage area.

15. The method of disposing of drill cuttings of claim 1, wherein in step "a" the cover is slidably connected to the at least one storage area.

16. The method of disposing of drill cuttings of claim 1, wherein in step "a" the barge has an upper surface area and the at least one storage area occupies at least about fifty percent of the upper surface area.

17. A method of disposing of drill cuttings from an oil and/or gas well drilling platform, comprising:
   (a) providing a barge having at least one storage compartment, a cover operably connected to the at least one storage compartment, the cover having multiple cover sections that are positioned closely adjacent each other when operably connected to the at least one storage compartment;
(b) placing the at least one storage compartment in a first open state by moving at least one but not all cover sections;
(c) receiving cuttings through the inlet cuttings in the barge's at least one storage compartment;
(d) after step "c", placing the at least one storage compartment in a closed state by repositioning the plurality of cover plates over the at least one storage area so that the cuttings in the storage area are contained;
(e) transporting the barge to a collection site;
(f) placing the at least one storage compartment in a second open state by moving more of the cover sections than were moved in step "b", the second open state having a larger open area compared to the first open state; and
(g) removing through the inlet the cuttings from the barge's at least one storage compartment.

18. The method of disposing of drill cuttings of claim 17, wherein in step "a" the barge includes a second storage area and a second cover operably connected to the second storage area.

19. The method of disposing of drill cuttings of claim 17, wherein in step "a" the cover comprises a plurality of sections, each section being connected to the at least one storage area by a plurality of anchors.

20. The method of disposing of drill cuttings of claim 17, wherein in step "a" the barge has an upper surface area and the at least one storage area occupies at least about fifty percent of the upper surface area.

* * * * *